Feb. 28, 1950
J. B. ARMITAGE ET AL
2,498,870
BACKLASH COMPENSATOR
Original Filed Aug. 3, 1940
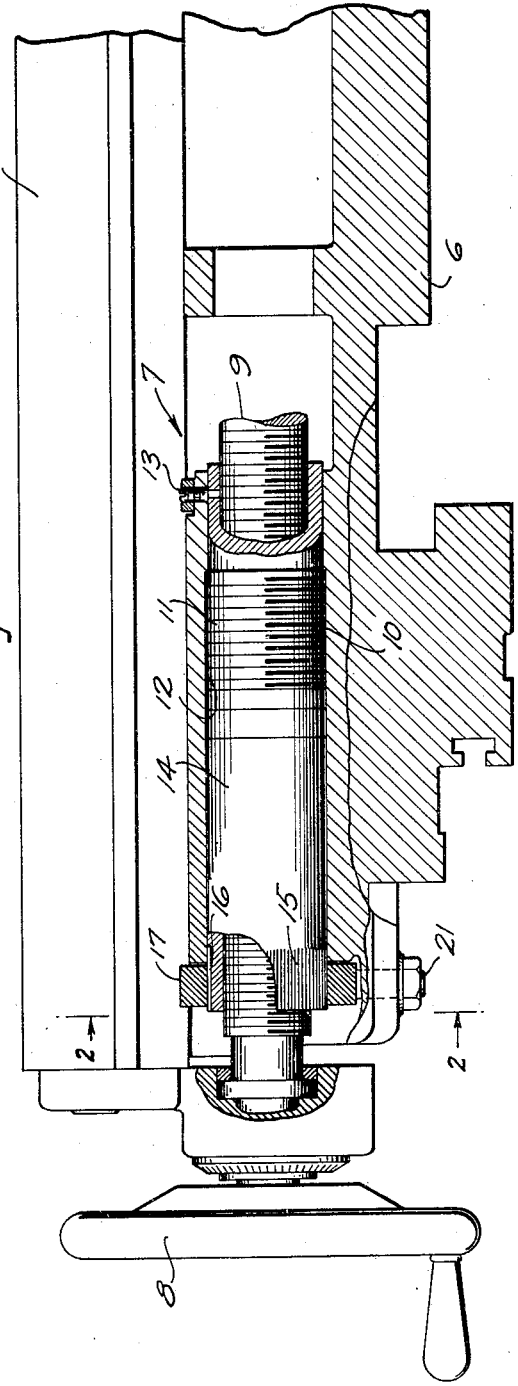
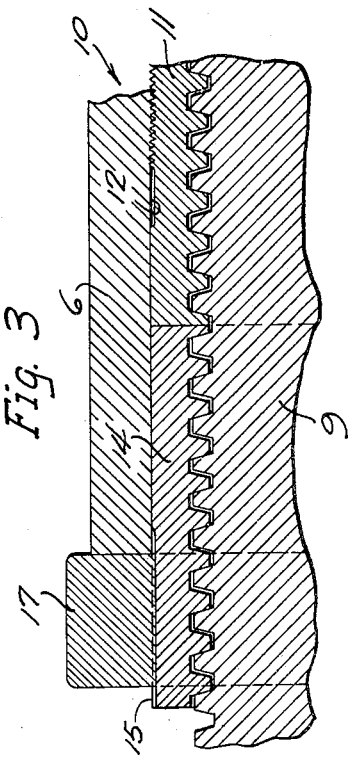
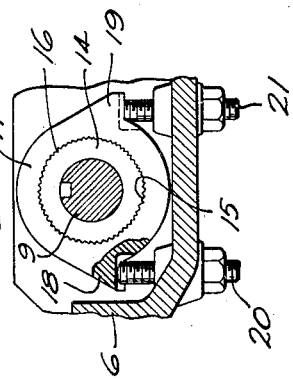
Inventors
Joseph B. Armitage
Theodore F. Eserkaln
By W. D. O'Connor
Attorney Patented Feb. 28, 1950

2,498,870

UNITED STATES PATENT OFFICE 2,498,870

BACKLASH COMPENSATOR

Joseph B. Armitage and Theodore F. Eserkaln, Wauwatosa, Wis., assignors to Kearney & Trecker Corporation, West Allis, Wis., a corporation of Wisconsin Original application August 3, 1940, Serial No. 350,666. Divided and this application September 4, 1945, Serial No. 614,204

12 Claims. (Cl. 74—441)

1

This invention relates generally to transmission mechanism, and more particularly to mechanism for eliminating backlash from rotatable transmission elements.

This invention constitutes a division of co-pending application Serial No. 350,666, filed August 3, 1940, which issued October 2, 1945 as Patent No. 2,385,907.

A general object of the invention is to provide an improved arrangement for preventing backlash between threadedly engaging members.

Another object is to provide improved backlash eliminating mechanism for a driving screw in a machine tool.

Another object of the invention is to provide an improved precision adjusting means for a backlash compensator.

Another object of the invention is to provide an improved adjustable backlash compensator having means for making precision adjustments and means for making large approximate adjustments.

According to this invention, an improved backlash compensator is provided wherein the backlash factor can be precisely controlled and reduced to a minimum. The compensator comprises a double segment nut element adjustably mounted on a screw. One segment of the nut is fixedly retained in the machine tool saddle while the other segment is adjustably disposed in the saddle to abut one end of the fixed segment. The outer end of the adjustable segment is serrated to receive a nut adjusting yoke. Approximate backlash adjustments are possible by changing the relative setting of the serrated yoke and adjustable segment while precision backlash adjustments are effected through the adjustment of a pair of adjusting screws disposed in the saddle to engage the yoke.

The foregoing and other objects of this invention, which will become more fully apparent from the following detailed specification, may be achieved by the particular structure constituting an exemplifying embodiment of the invention that is depicted in and described in connection with the accompanying drawing, in which:

Figure 1 is a view in vertical longitudinal section of a machine tool table and saddle structure showing a backlash compensator incorporated therein according to the teachings of this invention;

Fig. 2 is a transverse sectional view of the adjusting means for the backlash compensator, taken along the line 2—2 in Fig. 1; and, Fig. 3 is an enlarged fragmentary and somewhat diagrammatical view, in longitudinal section illustrating the operation of the backlash compensator shown in Fig. 1.

The backlash compensator or screw and nut adjusting mechanism, shown generally in Fig. 1 of the drawing as exemplifying a preferred embodiment of the invention, is shown operably mounted in the movable saddle and table of a knee type milling machine, such as is shown and disclosed in the aforementioned patent. It is to be understood that the compensator may be incorporated in and utilized on any machine having a screw and nut drive mechanism with equal advantage and utility.

Referring to the drawing, and particularly to Fig. 1 thereof, a milling machine table or work retaining member 5 is shown slidably mounted on a saddle 6 to constitute the work supporting structure of the machine. Manual or power movement of the table 5 may be effected by the operation of a screw and nut mechanism 7 in a well known manner. The selective rotation of a hand wheel 8 on the left end of a rotatably mounted table screw 9 permits manual operation while a power source (not shown) connecting with reversible gears (not shown) contained in the saddle 6 provides means for the power operation of the screw for moving the table in either direction at any one of a plurality of feed rates.

A fixed table driving nut 10, constituting a part of the screw and nut mechanism 7, is made adjustable for the purpose of maintaining close engagement with the table driving screw 9 to adapt the machine to climb cutting operations. The adjustable nut mechanism or backlash compensator 10 will serve to accurately control backlash in any similar screw and nut mechanism. As best shown in Fig. 1, the nut structure comprises two parts or segments, one of which is a main or fixed nut element 11 that has screw threaded engagement with a receiving bore 12 in the saddle 6 and is locked rigidly in the saddle by a locking screw 13. The other or adjusting nut element is in the form of a cylindrical member 14 that is rotatably received in the bore 12, and is normally positioned to abut one end of the stationary nut element 11. As best shown in Figs. 1 and 2, the outer end of the adjustable nut element 14 is provided with circumferentially arranged peripheral or external serrations 15 adapted to cooperate with complementary internal serrations 16 in a ring that constitutes a nut adjusting yoke or arm 17.

In adjusting the nut mechanism 10 to take up the lost motion or backlash between it and the screw 9, the adjustable nut element 14 is turned upon the screw 9 to bring it into abutting relationship with the fixed nut element 11. After a coarse or approximate adjustment has been effected in this manner, the internally serrated ring or nut adjusting yoke 17 is fitted or the serrated end of the nut element 14 in the position shown in Fig. 2. A pair of lugs 18 and 19 projecting at opposite sides of the ring or yoke 17 serve as abutments for engagement by adjusting set screws 20 and 21 threaded in the saddle structure 6. By turning the adjusting screws 20 and 21 in opposite directions, the adjustable nut element 14 may be turned on the screw 9 under positive control for effecting close adjustment of the degree of engagement between the nut mechanism 10 and the table screw 9.

With the nut structure thus closely adjusted, the left faces of the screw threads in the adjustable nut element 14 are brought into contact with the right faces of the threads on the screw 9, as shown in Fig. 3, while the right faces of the threads in the fixed element 11 are caused to engage the left faces of the threads of the screw 9. By this arrangement, the fixed nut element 11 exerts force on the screw in direction to prevent further movement thereof to the left, while the adjustable nut element 14 exerts force on the screw in a direction to prevent movement thereof to the right, the adjustable element transmitting force from the screw to the fixed element through the abutting relationship therebetween.

Compensation for wear may be effected and any desired degree of tightness may be established readily by first setting the adjustable nut element 14 approximately through adjusting the serrated connection between it and the ring or yoke 17, and then carefully turning the yoke by loosening one adjusting screw and tightening the other, the two screws serving to lock the nut element in adjusted position. Lock nuts are provided to hold the screws securely after the adjustment is completed. In this manner, backlash in a screw and nut mechanism can be readily controlled. The degree of tightness between the screw and nut may be varied to best accommodate various types of cutting operations on machine tools.

From the foregoing detailed description of the illustrative structure set forth herein to disclose the principles of the invention, it is apparent that there has been provided an improved backlash eliminator adapted to accurately control backlash in a screw and nut mechanism. While the invention is shown adapted to machine tool elements, it may be adapted to other types of screw and nut mechanisms with equal utility.

Although the invention has been described in considerable detail in order to fully disclose the invention and its application, it is to be understood that the particular apparatus shown and described is intended to be illustrative only and that the various novel features of the invention may be incorporated in other structural forms without departing from the spirit and scope of the invention, as described in the subjoined claims.

The principles of this invention having now been fully explained in connection with the foregoing description setting forth illustrative embodying apparatus, we hereby claim as our invention:

1. In a machine tool provided with a movable supporting member, means for moving said member including a screw and nut mechanism, said mechanism comprising a rotatably mounted feed screw, a non-rotatable nut element disposed to engage and cooperate with said feed screw, a rotatable nut element disposed to engage said screw and arranged to be turned relative to said non-rotatable nut element for adjusting its contact with said screw said rotatable nut element presenting a serrated peripheral surface, a ring carrying an adjusting arm and presenting internal serrations complementary to the serrations on said rotatable nut element and adapted to be engaged therewith at any predetermined angular position, and an adjusting screw disposed to engage said adjusting arm for turning said rotatable nut element to adjust its engagement with said screw.

2. In a machine tool, a frame, a supporting member movably mounted on said frame, a feed screw rotatably mounted in said movable supporting member, a nut element mounted in said frame in position to cooperate with said feed screw, said nut element being fixed against rotation and against axial movement, means to rotate said feed screw in said nut to effect movement of said supporting member, an adjusting nut element rotatably mounted in said frame and adapted to abut longitudinally against said fixed nut element, said adjusting nut element being engaged with said feed screw and presenting external serrations at one end, an adjusting yoke provided with internal serrations complementary to the serrations on said adjusting nut element and adapted to be engaged with said nut element at a selected angular position to provide coarse adjustment of said nut, and an adjusting set screw threaded in said frame and disposed to engage said yoke in manner to turn it for turning said adjusting nut element in abutting engagement with said fixed nut element to provide fine adjustment of said nut, whereby said adjusting nut element may be turned in threaded engagement with said screw in manner to force the threads of said screw into engagement with the threads of said fixed nut element to a predetermined degree of tightness for obviating backlash therebetween.

3. A backlash compensator for a screw and nut mechanism comprising a rotatably mounted screw, a non-rotatable nut element threadedly engaged by said screw, a rotatable nut element threadedly engaged by said screw and disposed for adjustment relative to said non-rotatable element, an adjusting yoke adapted to be locked on said rotatable nut element selectively at any angular position, and adjusting means disposed to engage said yoke for turning said rotatable nut element precisely to adjust its engagement with said screw.

4. In an adjusting mechanism for a backlash eliminator on a machine tool screw and nut drive, a fixed nut element threaded on the screw for imparting axial force to the screw in one direction, an externally serrated adjustable nut element threaded on the screw for imparting axial force to the screw in the opposite direction, an internally serrated yoke disposed to slidably engage the serrations of said adjustable nut element at a selected angular position, and an adjusting means operative on said yoke to permit a precise adjustment of said adjustable nut element to eliminate backlash between said nut elements and the screw.

5. In an adjustable backlash eliminator for a machine tool screw and nut drive mechanism, a fixed nut element threaded on the screw, an adjustable nut element threaded on the screw and abutting said fixed nut element, an adjusting yoke selectively keyed to said adjustable nut element, and adjusting screws engaging said yoke to provide a positive control of the positioning of said yoke and said adjustable nut element relative to said fixed nut element.

6. In an anti-backlash screw and nut mechanism, a screw, a nut element fixed against rotation and against axial movement and having threaded engagement with said screw, an adjustable nut element restrained against axial movement and threaded on said screw for rotation relative to said fixed nut element, said adjustable nut element presenting peripheral serrations, an adjusting ring presenting adjusting lugs and provided with internal serrations complementary to the peripheral serrations on said adjustable nut element and arranged to engage them at a selected one of a plurality of angular positions to provide for coarse adjustment of the angular relationship of said adjustable nut element to said fixed nut element, and screw threaded adjusting means arranged to engage said adjusting lugs to turn said ring to effect fine adjustment of the angular position of said adjustable nut element, whereby said adjustable nut element may be turned to engage said screw in manner to force its threads into close engagement with the threads of said fixed nut element for obviating backlash therebetween.

7. A machine tool, including a screw and nut mechanism for moving a movable supporting member, said mechanism comprising a non-rotatable nut element disposed to engage and cooperate with a rotatably mounted feed screw, an adjustable nut element disposed to engage said screw and arranged to be turned relative to said non-rotatable nut element for adjusting its contact with said screw, said adjustable nut element presenting a serrated peripheral surface, an adjusting ring provided with a lug and presenting internal serrations complementary to the serrations on said adjustable nut element and adapted to be engaged therewith at any predetermined angular position, and adjusting screw means disposed to engage said adjusting ring lug for turning said adjustable nut element to adjust its engagement with said feed screw.

8. A machine tool according to claim 7, wherein the non-rotatable nut element is fixed against axial movement and has threaded engagement with the screw, the adjustable nut element is threaded on said screw for rotation relative to said non-rotatable nut element and limited in axial movement relative thereto.

9. A machine tool according to claim 7, wherein the feed screw is rotatably mounted in said movable supporting member the non-rotatable nut element is mounted in said member the adjustable nut element is adapted to abut longitudinally against the non-rotatable nut element, said adjustable nut element presenting external serrations at one end, and there is provided an adjusting ring provided with internal serrations complementary to the serrations on said adjustable nut element and adapted to be engaged with said nut element at a selected one of a number of angular positions to provide coarse adjustment of the adjustable nut, and an adjusting set screw threaded means, such as a pair of set screws, threaded in said movable supporting member and disposed to engage said ring in a manner to turn it in either direction for turning said nut element in abutting engagement with said member to provide fine adjustment of said adjustable nut, whereby said adjustable nut element may be turned in threaded engagement with said screw in manner to force the threads of said screw into engagement with the threads of said non-rotatable nut element to a predetermined degree of tightness for obviating backlash therebetween.

10. Adjusting means for a screw and nut backlash eliminator having a fixed nut and an externally serrated rotatable adjusting nut, comprising an internally serrated adjusting ring adapted to be slidably received on the externally serrated surface of said adjusting nut, lugs extending from said ring, and adjusting screws engaging each of said lugs, whereby the adjustment of one of said screws effects ring and nut movement in one direction on the screw and adjustment of the other of said screws effects movement in the opposite direction, the arrangement being such that the degree of tightness between the nuts and screw may be accurately controlled.

11. In a machine tool, a screw and nut mechanism for moving a movable supporting member, comprising a non-rotatable nut element fixed against axial movement, a rotatably mounted feed screw operably engaging said nut element, an adjustable nut element disposed to engage said feed screw and arranged to be turned relative to said non-rotatable nut element while restrained againt axial movement, an adjusting ring selectively keyed to said adjustable nut element at any predetermined angular position and presenting adjusting lugs, and adjusting screws disposed to engage said adjusting lugs on said adjusting ring for turning said adjustable nut element to adjust its engagement with said screw.

12. A backlash eliminator for a screw and nut mechanism of the type including a fixed nut and a cooperating rotatable screw, comprising a main nut element fixed against rotation and against axial movement, an adjusting nut element free to rotate but fixed against axial movement and presenting peripheral serrations, a cooperating screw having threaded engagement with both said nut elements, a yoke presenting internal serrations complementary to and selectively fitted on said serrations of said adjusting nut element and having adjusting lugs extending therefrom, and adjusting means including set screws disposed to engage said adjusting lugs respectively, whereby said adjusting nut element may be rotated by said set screws to adjust the degree of engagement between the threads of said screw and the threads of said nut elements, the arrangement being such that said yoke may be angularly positioned on said adjusting nut element serrations to accommodate said adjusting lugs to said set screws.

JOSEPH B. ARMITAGE.
THEODORE F. ESERKALN.

No references cited.